United States Patent [19]

Eklund

[11] Patent Number: 4,718,173

[45] Date of Patent: Jan. 12, 1988

[54] METHOD AND APPARATUS FOR MEASUREMENT OF STRAIGHTNESS AND FLATNESS

[75] Inventor: Fritz Eklund, Karlskoga, Sweden

[73] Assignee: Aktiebolaget Bofors, Bofors, Sweden

[21] Appl. No.: 787,556

[22] Filed: Oct. 15, 1985

[30] Foreign Application Priority Data

Oct. 19, 1984 [SE] Sweden .................................. 8405221

[51] Int. Cl.$^4$ .............................................. G01B 5/24
[52] U.S. Cl. ........................................ 33/533; 33/538; 33/521; 33/366
[58] Field of Search ............... 33/533, 538, 536, 534, 33/521, 366, 1 Q, 1 E, 16, 287, 374, 375, 376

[56] References Cited

U.S. PATENT DOCUMENTS

| | | | |
|---|---|---|---|
| 2,788,578 | 4/1957 | Digiacinto | 33/375 |
| 3,751,818 | 8/1973 | Eller, Jr. | 33/338 |
| 3,835,546 | 9/1974 | Jaquet | 33/366 |
| 4,434,558 | 3/1984 | Face, Jr. et al. | 33/366 |
| 4,473,960 | 10/1984 | Face, Jr. et al. | 33/366 |

Primary Examiner—Willis Little
Attorney, Agent, or Firm—Pollock, Vande Sande and Priddy

[57] ABSTRACT

The present invention relates to a method and apparatus for high-precision straightness and flatness measurement of objects which are so large that available measuring rulers do not cover the distance to be measured. According to the invention, the measurements are carried out in stages through the use of a measuring ruler which rests on freely adjustable feet and which is used as a base for a measuring instrument with independent reference points relative to the actual surface or edge.

2 Claims, 4 Drawing Figures

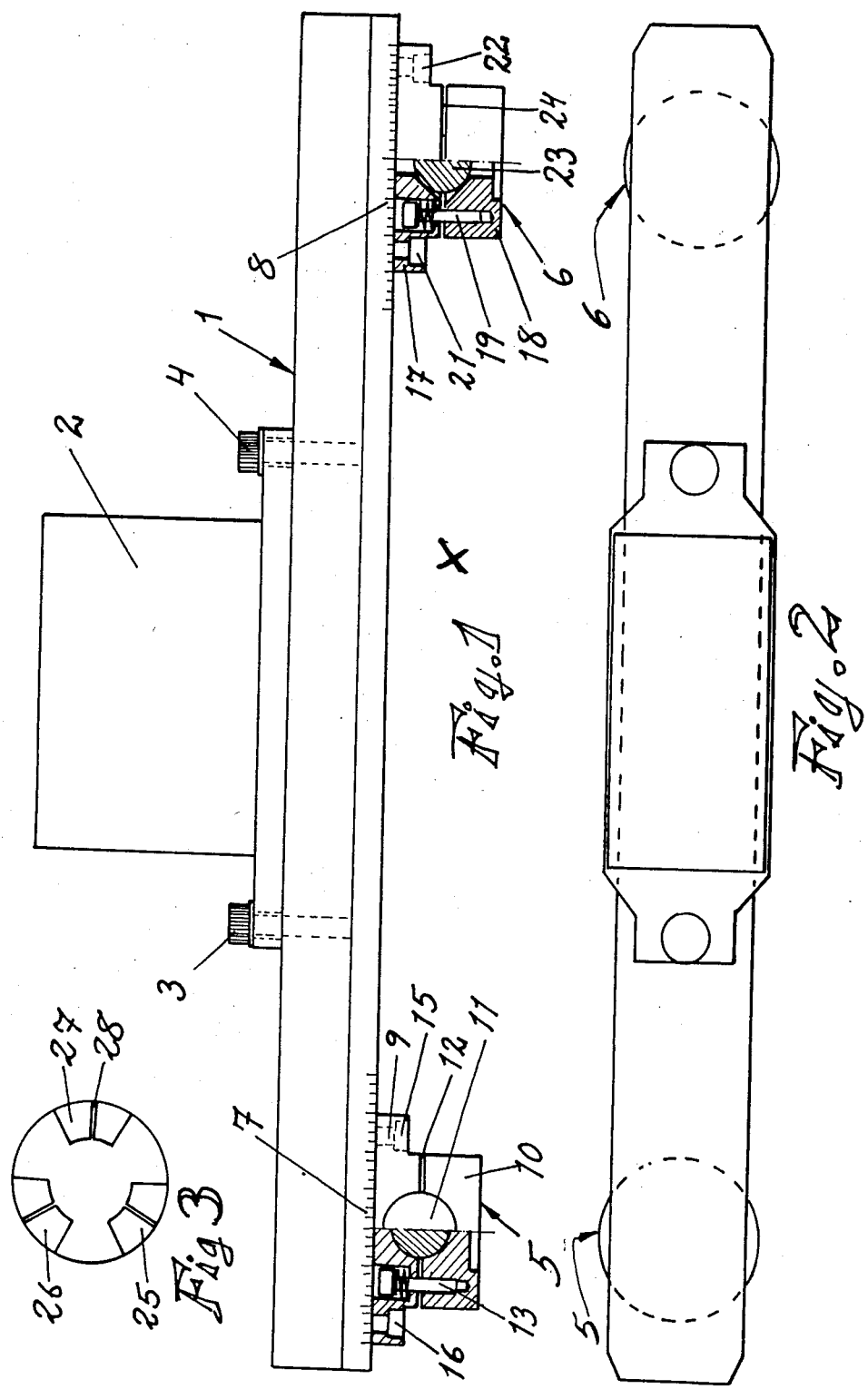

METHOD AND APPARATUS FOR MEASUREMENT OF STRAIGHTNESS AND FLATNESS

BACKGROUND OF THE INVENTION

The present invention relates to a method and apparatus for high-precision straightness and flatness measurements across objects which are so large that available measuring rulers do not cover the distances to be measured.

Relatively easy-to-use, dependable and accurate measuring instruments such as electronic levels, laser and autocollimation systems etc. are currently available for straightness and flatness measurement of large objects even in factory premises. However there are major shortcomings in the devices used as reference and contact elements between the object of measurement and the instruments used to measure it when the objects are so large that they are not covered by available measuring rulers.

SUMMARY OF THE INVENTION

The object of the present invention is to solve these disadvantages by providing a suitable apparatus for this purpose and an appropriately adapted measuring method.

According to the invention the measuring instrument or its reference means is supported according to the invention by a measuring ruler furnished with two feet or contact elements disposed at a predetermined distance from each other, the distance between these feet defining the distance between subsequent measuring points in the measurement procedure which is performed in stages.

The measuring ruler is thus moved in stages between the readings so that the second foot, at each subsequent reading, reaches the position of the first foot in the preceding reading. The sum total of the readings in a series then provides a very good picture of the straightness of the measured distance and many intersecting distances give an equally good picture of the flatness of a surface. To obtain completely reliable and reproducible values, it is essential that the contact of the measuring ruler against the surface of the measured object be identical in each measuring stage. The measuring ruler according to the invention is therefore provided with two specially designed feet. One of which is freely pivotable around a shaft which is perpendicular to the longitudinal direction of the measuring ruler. The other foot is freely pivotable around a ball joint, i.e. in all directions. Since this is a precision instrument, the movements concerned do not need to cover particularly many degrees. However the adjustments described above are required.

In a similar manner, the contact soles of the feet against the measuring objects must be made so that they provide the best possible contact. According to one embodiment of the invention, each of the contact soles is therefore designed as three annular sectors located symmetrically in the same plane.

The invention has been defined in the accompanying patent claims and will now be further described with reference to the accompanying figures, wherein

BRIEF DESCRIPTION OF THE DRAWINGS

FIG. 1 shows a partly sectioned side projection of a measuring ruler equipped with contact elements of the type characteristic of the invention.

FIG. 2 shows a vertical view of the ruler shown in FIG. 1,

FIG. 3 is a detail of the soles on the contact elements of the measuring ruler and FIG. 4 illustrates how a measurement is performed with the aid of the ruler.

DESCRIPTION OF THE PREFERRED EMBODIMENTS

Figure 4:
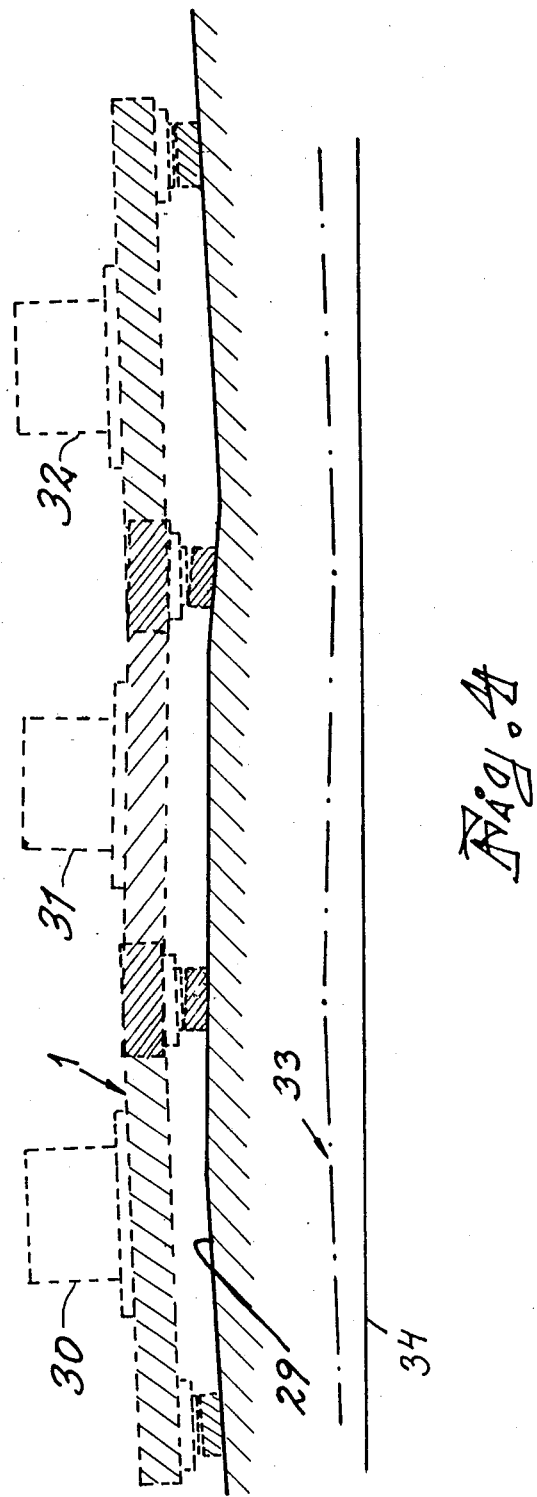

The apparatus shown in FIG. 1 consists of ruler 1 to which a measuring instrument 2 with a free-standing reference point is attached by means of bolts 3, 4. The measuring instrument may be for example an electronic level, or reflectors for laser or autocollimators. Ruler 1 is further provided with two movable feet or contact elements 5 and 6 and with two scales 7 and 8 for selection of the distance required on each specific occasion between the feet 5 and 6.

Foot 5 consists of an upper portion 9 and a lower portion 10. Located between sections 9 and 10 is a shaft 11 which is always perpendicularly disposed relative to ruler 1, the shaft being carried in bearings in sections 9 and 10. Foot 5 ensures that shaft 11 is always parallel with the surface to be measured during use of ruler 1. Portions 9 and 10 turn freely around shaft 11, the amount allowed by play 12 between the portions, which are held together by spring-loaded bolts 13 and 14 (only 13 is shown in the figure). Foot 5 is further attached to ruler 1 by means of bolts 15, 16.

The second foot 6 consists of upper portion 17 and lower portion 18. The portions are held together by spring-loaded bolts 19, 20 (only 19 is shown in the figure) and upper portion 17 is secured to the ruler by means of bolts 21, 22. Portions 17 and 18 are freely movable relative to each other around ball 23. This mobility applies in all directions as far as play 24 between portions 17 and 18 permits.

FIG. 3 illustrates the soles on lower portions 10 and 18 respectively of feet 5 and 6. As is evident from the figure, the contact surface of the soles, adjacent the surface to be measured has the form of three annular sectors 25, 26 and 27 which are disposed symmetrically in the same plane. These are preferably made of a very hard material which can be ground to a very high surface finish, e.g. cemented carbide. It may also be appropriate to divide each such contact surface into two or more subsurfaces by means of a groove 28.

FIG. 4 shows schematically how a measurement is performed using the ruler according to the invention. The surface along which the measurement is to be made is designated 29. Ruler 1 is placed in a first position 30 and an instrument reading is taken. The ruler is then moved to a second position 31 for a new reading after which it is moved again to position 32 and so on.

The values read provide the curve 33 shown plotted in a broken line which can be compared with the straight line 34. Adjustable feet 5 and 6 of the ruler ensure very high reproducibility between several measurements along the same distance, therefore providing highly reliable measurements.

I claim:

1. An apparatus for high precision straightness and flatness measurements comprising: a measuring ruler supporting a measuring instrument or its reference means, said ruler being provided with first and second adjustable contact elements spaced from each other at a spacing predetermined for each specific measurement, said spacing defining a distance between subsequent measuring points, the first of said contact elements being provided with a shaft which is perpendicular to the longitudinal direction of said measuring ruler, said first contact element being pivotable around said shaft, said second contact element being provided with a ball joint and freely pivotable in all directions around said ball joint, wherein said contact elements comprise identical feet, each foot comprising an ending position facing the surface to be measured, said ending portion comprising three annular contact sectors located symmetrically in the same plane and providing for substantially identical contact against the surface of the measured object in each measuring stage.

2. An apparatus according to claim 1 wherein each annular contact sector is divided into two subsectors by a central radial groove.

* * * * *